(12) United States Patent
Muskovac et al.

(10) Patent No.: US 9,114,764 B2
(45) Date of Patent: Aug. 25, 2015

(54) ATTACHMENT ASSEMBLY

(71) Applicant: GM GLOBAL TECHNOLOGY OPERATIONS LLC, Detroit, MI (US)

(72) Inventors: Eric W. Muskovac, Macomb, MI (US); Paul V. Viscomi, Macomb, MI (US); Larry A. Filipczak, West Bloomfield, MI (US); John K. Itoney, St. Clair Shores, MI (US); Robert D. Conner, Lenox, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 13/925,016

(22) Filed: Jun. 24, 2013

(65) Prior Publication Data

US 2014/0373475 A1    Dec. 25, 2014

(51) Int. Cl.
*B60R 13/04* (2006.01)
*F16B 5/12* (2006.01)

(52) U.S. Cl.
CPC .. *B60R 13/04* (2013.01); *F16B 5/12* (2013.01)

(58) Field of Classification Search
CPC .................................. B60R 13/04; F16B 5/12
USPC ......................................................... 296/1.08
See application file for complete search history.

(56) References Cited

U.S. PATENT DOCUMENTS

2011/0204671 A1\* 8/2011 Baratin ........................... 296/93

\* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

An attachment assembly includes a molding, a support member, and a clip. The molding assembly includes a molding body and a molding protrusion extending from the molding body. The support member includes a support body and defines a support opening that extends into the support body. The clip includes a first clip arm and a second clip arm coupled to the first clip arm. The first clip arm is disposed in the support opening. The second clip arm is spaced apart from the support body so as to define a clip channel configured to receive the molding protrusion. The clip is configured to couple the molding assembly to the support member when the clip channel receives the molding protrusion.

17 Claims, 4 Drawing Sheets

ATTACHMENT ASSEMBLY

TECHNICAL FIELD

The present disclosure relates to assemblies and methods for attaching a window molding to a vehicle body.

BACKGROUND

Motor vehicles may include decorative moldings or moldings. These decorative moldings may include a highly reflective surface or any other suitable ornamental feature and are coupled to different parts of the vehicle. For example, in some vehicles, decorative moldings are placed around a window such as the quarter window to enhance the aesthetic appeal of the vehicle.

SUMMARY

The present disclosure relates to attachment assemblies for attaching a molding to a vehicle body. In an embodiment, the attachment assembly includes a molding, a support member, and a clip. The molding assembly includes a molding body and a molding protrusion extending from the molding body. The support member includes a support body and defines a support opening that extends into the support body. The clip includes a first clip arm and a second clip arm coupled to the first clip arm. The first clip arm is disposed in the support opening. The second clip arm is spaced apart from the support body so as to define a clip channel configured to receive the molding protrusion. The clip is configured to press the molding protrusion against the support body to couple the molding assembly to the support member when the clip channel receives the molding protrusion.

In an embodiment, the support body includes a support base supporting at least the first clip arm and a clip retainer spaced from the support base so as to define the support opening. The clip retainer may be configured to retain the clip in the support member. The second clip arm may be configured to press the molding protrusion against the clip retainer to couple the molding assembly to the support member. The molding protrusion may be referred to as the first molding protrusion, and the molding assembly includes a second molding protrusion extending from the first molding protrusion. The support member defines a recess extending into the clip retainer. The recess is configured to receive the second molding protrusion. The second molding protrusion is configured to snap into the recess to couple the molding assembly to the support member. The first molding protrusion may be a blade.

The molding assembly may include a third molding protrusion extending from the molding body. The support member may define a support locating hole extending through the support body and configured to receive the third molding protrusion to fix the support the molding assembly relative to the support member. The third molding protrusion may be a locating pin. The clip retainer may be referred to as the first clip retainer, and the support member includes a clip retainer spaced apart from the first clip retainer along a first direction so as to define a gap between the first clip retainer and the second clip retainer. The support opening may be referred to as the first support opening. The second clip retainer is spaced apart from the support base so as to define a second support opening.

The clip may include a first clip portion partly received in the first support opening, a second clip portion partly disposed in the second support opening, and a clip base interconnecting the first clip portion and the second clip portion. The support base may include a first base portion overlapped by the first clip retainer, a second base portion aligned with the gap, and a third clip portion overlapped by the second clip retainer. The support member includes a support wall at the front edge of the second base portion and a rib at the rear edge of the second base portion, and the support wall and the rib are jointly configured to retain the clip base in the support body. The first clip portion and the second clip portion may be configured to press the first rim protrusion against the first and second clip retainers to couple the molding assembly to the support member when the clip channel receives the first molding protrusion. The second clip retainer may be spaced apart from the first clip retainer along a first direction. The first molding protrusion may extend from the molding body in a second direction. The second direction may be substantially perpendicular to the first direction. The second molding protrusion may extend from the first molding protrusion in a third direction. The third direction may be substantially perpendicular to the first direction. The support member may include locating pins extending from the support body in the third direction.

The present disclosure also relates to vehicles such as cars or trucks. In an embodiment, the vehicle includes a vehicle body, a molding, a support member, and a plurality of clips. The molding assembly includes a molding body and a molding protrusion extending from the molding body. The support member is coupled to the vehicle body and includes a support body. The clips are coupled to the support member. Each clip includes a first clip arm and a second clip arm coupled to the first clip arm. The second clip arm is spaced apart from the support body so as to define a clip channel. The molding protrusion is at least partly received in the clip channel. The clip is configured to press the molding protrusion against the support body to couple the molding assembly to the support member.

In an embodiment, the support member defines a plurality of support openings extending into the support body. Each support opening receives one of the first clip arms to couple the clips to the support member. The support body may include a support base supporting at least the first clip arm and a plurality of clip retainers each spaced from the support base so as to define the plurality of support openings. Each clip retainer may be configured to retain the clip in the support member. Each second clip arm may be configured to press the molding protrusion against one of the clip retainers to couple the molding assembly to the support member.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
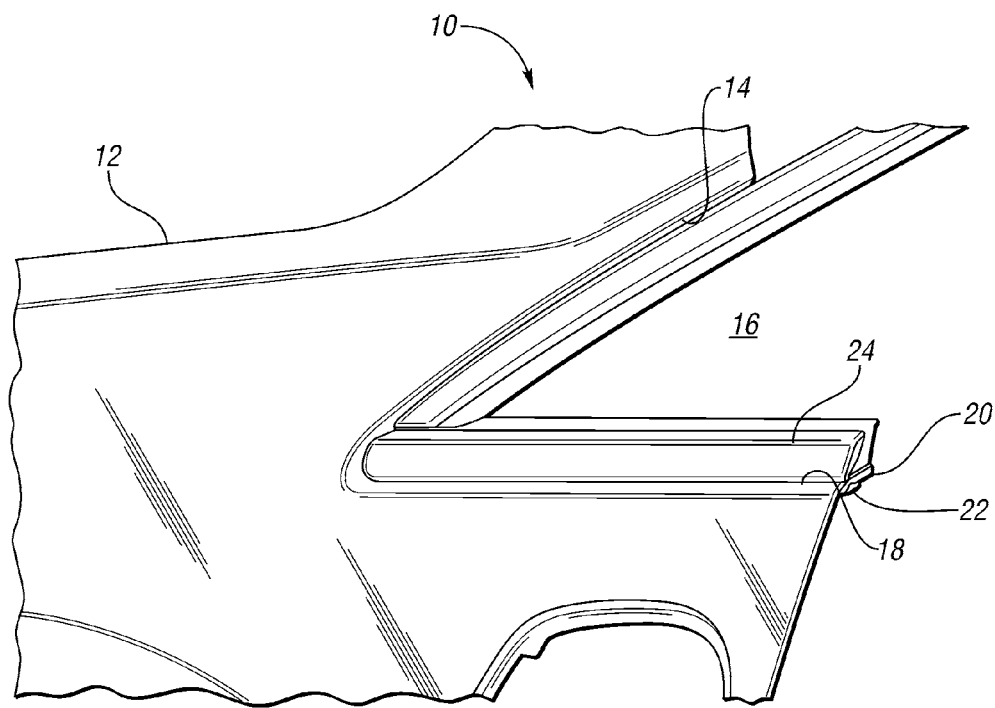
FIG. 1 is a schematic perspective view of an exterior portion of a vehicle including a vehicle body and window molding.
Figure 2:
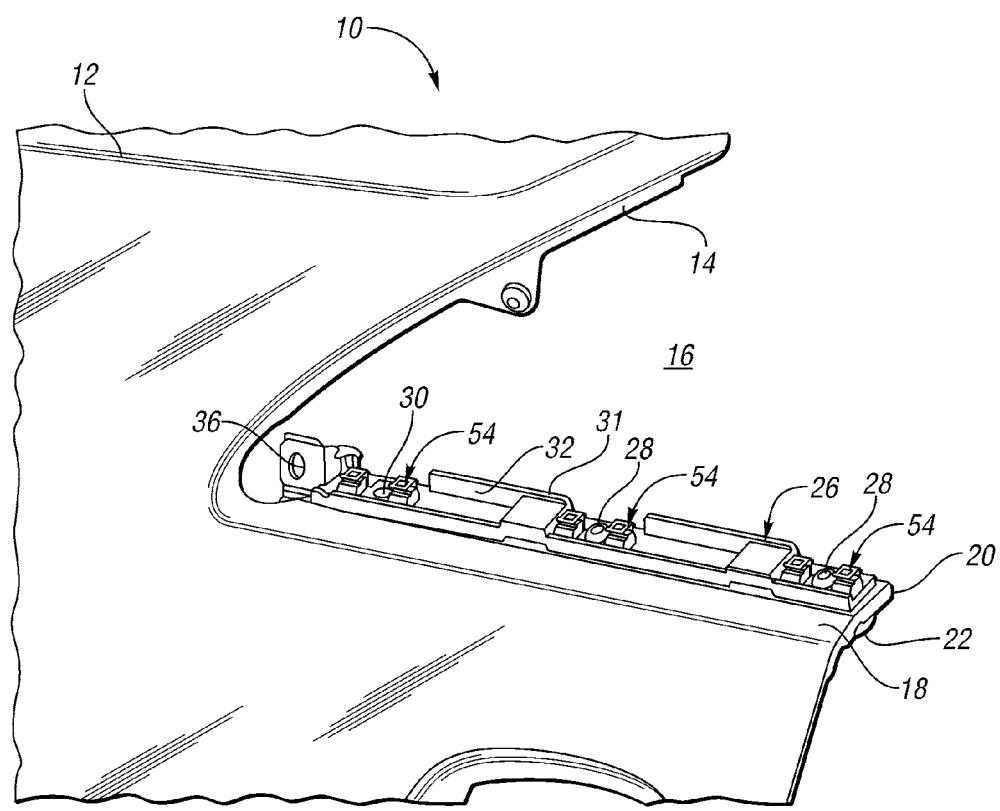
FIG. 2 is a schematic perspective view of the vehicle of FIG. 1 without the window molding and showing an attachment assembly including a plurality of clips.

Referring now to the drawings, wherein the like numerals indicate corresponding parts throughout the several views, FIGS. 1 and 2 show a portion of a vehicle 10 including a vehicle body 12. The vehicle body 12 includes a plurality of pillars 14 (e.g., C pillar) defining at least a portion of a vehicle window 16 such as a quarter window. The vehicle body 12 further includes a body edge 18 along the outer periphery of the vehicle window 16 and a body flange 20 extending from the body edge 18 toward an interior portion of the vehicle 10. The body flange 20 may be oriented at an oblique angle 22 relative to the body edge 18 and is configured to support a molding assembly 24. As used herein, the term "molding" means a decorative object, such as a strip or trim, used for ornamentation or finishing. Because the body flange 20 supports at least one molding assembly 24, it is desirable to develop an attachment assembly capable of attaching the molding assembly 24 to the body flange 20 or any other part of the vehicle body 12. It is especially important to develop an attachment assembly that is easily manufactured, cost-effective, light, and simple.

With continued reference to FIGS. 1 and 2, the vehicle 10 includes an attachment assembly 26 configured to couple the molding assembly 24 to the vehicle body 12. The attachment assembly 26 may also be referred to as a receiver substrate assembly and, in the depicted embodiment, is configured to couple the molding assembly 24 to the body flange 20. It is nonetheless envisioned that the attachment assembly 26 may couple the molding assembly 24 to other parts of the vehicle body 12. The attachment assembly 26 may be coupled to body flange 20 with one or more fasteners 28 such as screws, clinch nuts, rivets, or any other suitable fastener. The attachment assembly 26 and the molding assembly 24 collectively form an attachment assembly 25 (FIG. 4).

Figure 3:
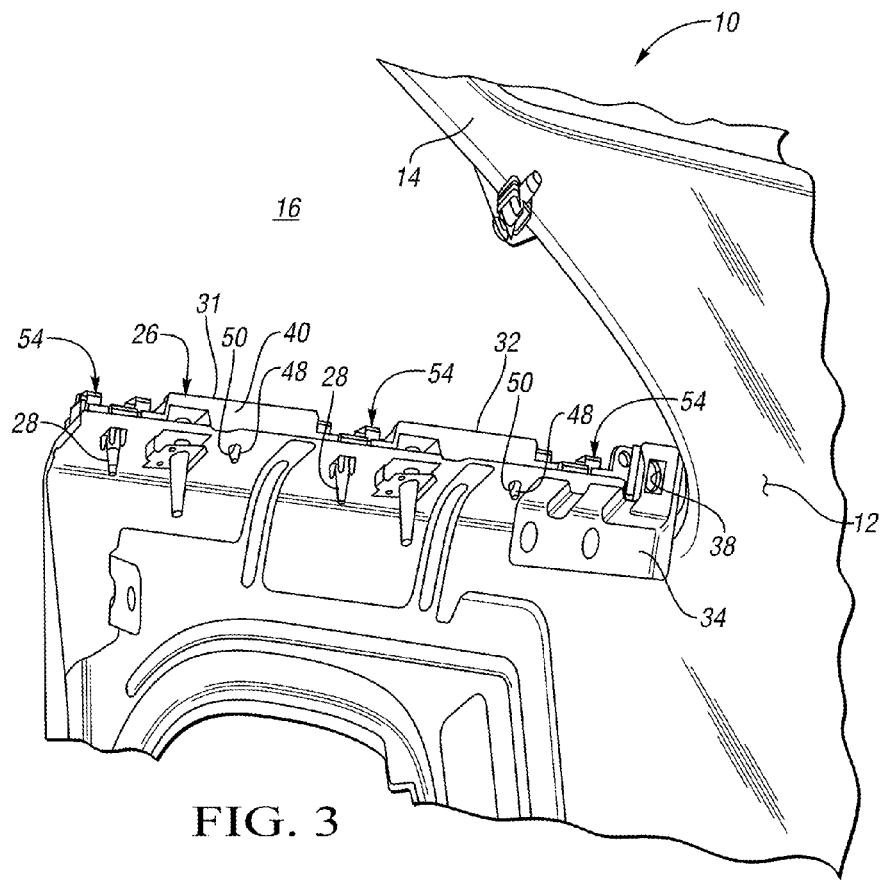
FIG. 3 is a schematic perspective view of an interior portion of the vehicle without the window molding and showing the attachment assembly.

With reference to FIGS. 2 and 3, the attachment assembly 26 may include a support member 31 and a plurality of clips 54. The support member 31 includes a support body 32 configured to support the clips 54 and the molding assembly 24. The attachment assembly 26 defines one or more attachment holes 30 (FIG. 2) extending through the support body 32. Each attachment hole 30 is configured, sized, and shaped to receive at least one fastener 28. During assembly, each fastener 28 may be inserted through one attachment hole 30, the support body 32, and the body flange 20 (or any other part of the vehicle body 12) to connect the attachment assembly 26 to the vehicle body 12 as shown in FIG. 3. The vehicle 10 may include one or more reinforcement brackets 34 to reinforce the connection between the attachment assembly 26 and the vehicle body 12. The attachment assembly 26 may include a reinforcement hole 36 (FIG. 2) extending through the support body 32 and substantially aligned with the attachment hole 38 (FIG. 3) of the reinforcement bracket 34. The substantial alignment of the reinforcement holes 36 of the support body 32 and the attachment hole 38 of the reinforcement bracket 34 allows a fastener (not shown) to be inserted through the reinforcement hole 36 of the attachment assembly 26 and one attachment hole 38 of the reinforcement bracket 34 to connect the attachment assembly 26 to the reinforcement bracket 34.

Figure 4:
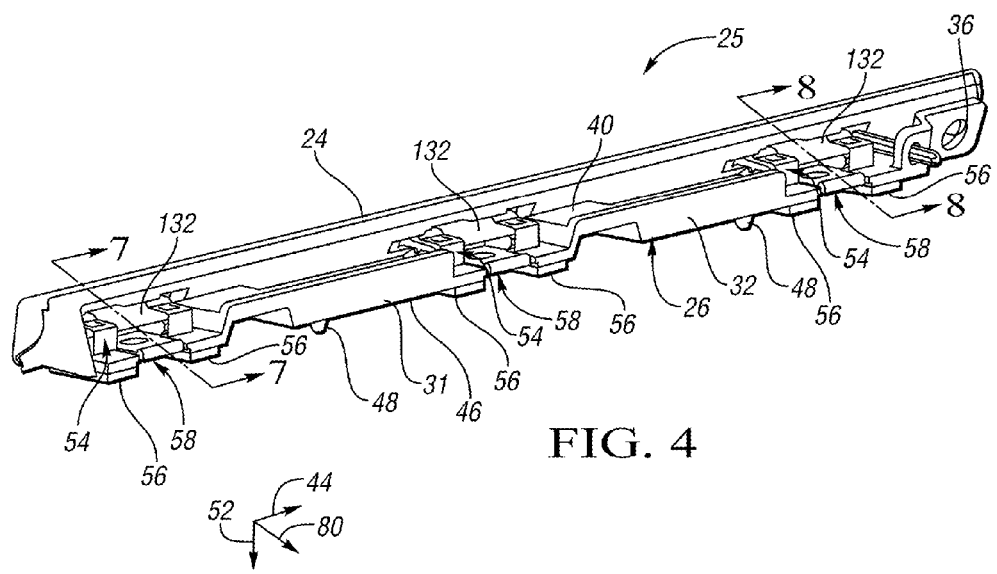
FIG. 4 is a schematic perspective view of the attachment assembly shown in FIG. 2.

With reference to FIGS. 3 and 4, the support body 32 of the attachment assembly 26 may be wholly or partly made of a substantially rigid material such as a rigid metal or plastic. In the depicted embodiment, the support body 32 may be elongated along a first direction indicated by arrow 44 and includes a first or top support surface 40 and a second or bottom support surface 46 opposite the first surface 40. The support body 32 also includes a third or front support surface 84 (FIG. 5) and a fourth or rear support surface 86 (FIG. 5) opposite the third support surface 84. The third support surface 84 (FIG. 5) is spaced from the fourth support surface 86 along a second direction indicated by arrow 80. The second direction indicated by arrow 80 may be substantially perpendicular to the first direction indicated by arrow 44. For example, the angle defined between the second direction indicated by arrow 80 and the first direction indicate by arrow 44 may range between 80 degrees and 100 degrees.

With continued reference to FIGS. 3 and 4, the attachment assembly 26 further includes one or more locating protrusions 48 (FIG. 4), such as locating pins, configured, shaped, and sized to be received in one or more vehicle locating holes 50 (FIG. 3) defined by the vehicle body 12 in order to fix the position of the attachment assembly 26 relative to the vehicle body 12. In the depicted embodiment, the vehicle locating holes 50 extend through the body flange 20. Therefore, when the locating protrusions 48 are inserted through the vehicle locating holes 50, the position of the attachment assembly 26 can be fixed with respect to the body flange 20. In the depicted embodiment, the attachment assembly 26 includes two locating protrusions 48 spaced apart from each other along the first direction indicated by arrow 44. Accordingly, the vehicle body 12 defines two vehicle locating holes 50 extending through the body flange 20. Each locating protrusion 48 is configured, shaped, and sized to be received in one vehicle locating hole 50 to fix the attachment assembly 26 relative to the vehicle body 12. It is nevertheless contemplated that the attachment assembly 26 may include more or fewer locating protrusions 48.

With continued reference to FIGS. 3 and 4, in the depicted embodiment, the locating protrusions 48 are spaced apart from each other along the first direction indicated by arrow 44. Each locating protrusion 48 extends from the support body 32 in a third direction indicated by arrow 52. For instance, the locating protrusions 48 may extend from the second support surface 46 in the third direction indicated by arrow 52. The third direction indicated by arrow 52 may be substantially perpendicular to the first direction indicated by arrow 44. For example, the angle defined between the third direction indicated by arrow 52 and the first direction indicated by arrow 44 may range between 80 and 100 degrees. The locating protrusions 48 may be coupled to, monolithically formed with, the support body 32.

With continued reference to FIGS. 3 and 4, the attachment assembly 26 includes one or more pads 56 coupled to the second support surface 46 of the support body 32. The pads 56 may be wholly or partly made of a polymeric material and can reduce wear of the support body 32 by avoiding direct contact between the second support surface 46 of the support body 32 and the body flange 20 (FIG. 2) of the vehicle body 12.

With continued reference to FIGS. 3 and 4, the attachment assembly 26 further includes one or more clips 54 configured to couple the molding assembly 24 to the support body 32. In the depicted embodiment, the attachment assembly 26 includes three clips 54 supported by the support body 32 and spaced apart from one another along the first direction indicated by arrow 44. It is envisioned, however, that the attachment assembly 26 may include more or fewer clips 54.

Figure 5:
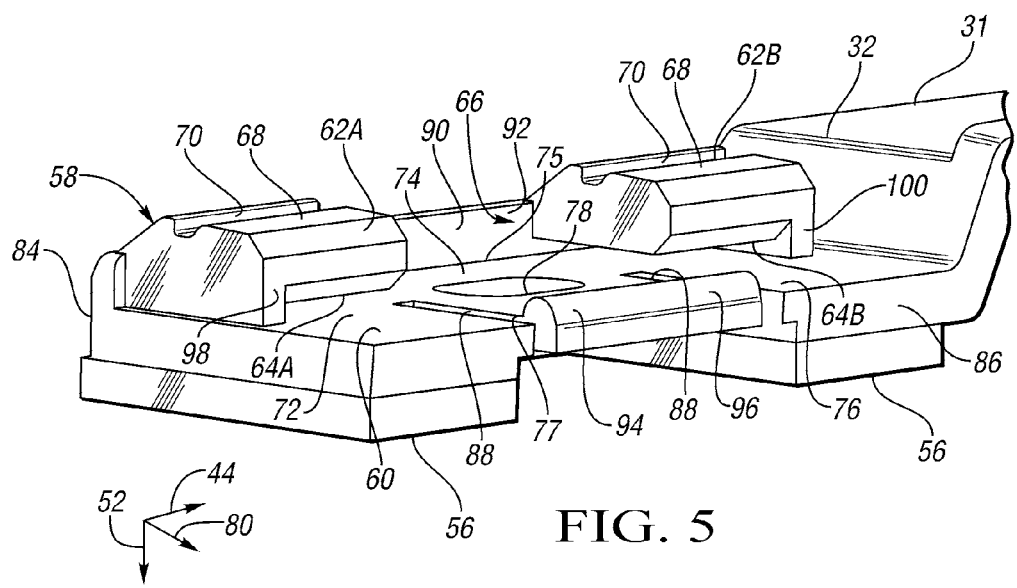
FIG. 5 is a schematic perspective view of a portion of the attachment assembly without the clips.
Figure 6:
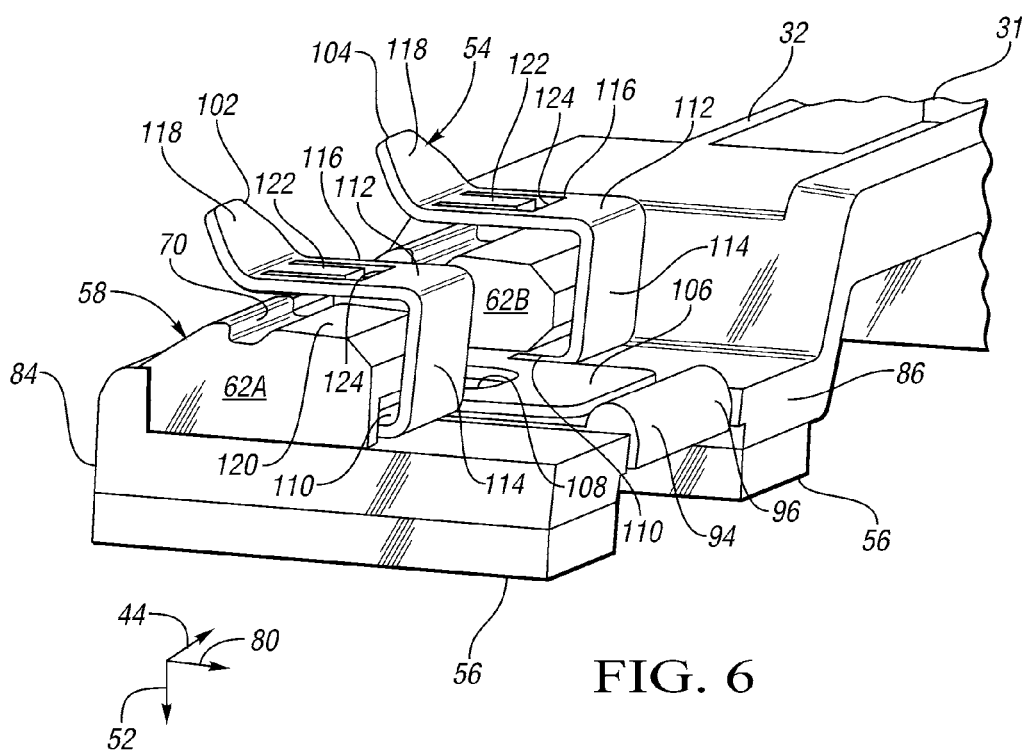
FIG. 6 is a schematic perspective view of a portion of the attachment assembly with the clips.

With reference to FIG. 5, the support body 32 includes one or more clip receiving regions 58 for receiving at least one clip 54 (FIG. 6). In the depicted embodiment, the support body 32 includes three clip receiving regions 58 each configured, shaped, and sized to receive one clip 54 (FIG. 6). Each clip receiving region 58 includes a support base 60 configured to support the clip 54 (FIG. 6) and one or more clip retainers 62A, B. In the depicted embodiment, each clip receiving portion 58 includes two adjacent clip retainers 62A, B spaced apart from one another along the first direction indicated by arrow 44, thereby defining a gap 66 between the two adjacent clip retainers 62A, B. The clip retainers 62A, B may be referred to as the first clip retainer 62A and the second clip retainer 62B. The clip retainers 62A, B are spaced apart from the support base 60 along the third direction indicated by arrow 52. As such, the support body 32 defines a support opening 64A or B, such as a slot, between the support base 60 and each clip retainer 62A, B. The support openings 64A, B are configured, sized, and shaped to receive a portion of the clip 54 (FIG. 6).

Each clip retainer 62A, B includes a retainer body 68 coupled to, or monolithically formed with, the support base 60 and defines a recess 70, such as a groove or channel, extending into the retainer body 68. Each recess 70 may be a cross car retention groove. Each recess 70 may be elongated along the first direction indicated by arrow 44 and is configured, shaped, and sized to receive a portion of the molding assembly 24 as described in detail below. For example, each recess 70 may have a substantially concave shape. The recesses 70 of adjacent clip retainers 62A, B may be substantially aligned with each other. It is contemplated that the recesses 70 of all the clip retainers 62A, B may be substantially aligned with one another along the first direction indicated by arrow 44.

As discussed above, clip receiving portion 58 includes one or more support bases 60. Each support base 60 may include a first base portion 72, a second base portion 74, and a third base portion 76 spaced apart from one another along the first direction indicated by arrow 44. The first base portion 72 is disposed underneath the first clip retainer 62A, while the third base portion 76 is disposed underneath the second clip retainer 62B. In other words, the first base portion 72 and the third base portion 76 each overlaps one clip retainer 62A, B. The second base portion 74 is disposed between the first base portion 72 and the third base portion 76 and is substantially aligned with the gap 66.

The support base 60 defines a base hole 78 (FIG. 5) extending through the second base portion 74 in the second direction 52 indicated by arrow 52. The base hole 78 is configured to receive one fastener 28 (FIG. 2). Accordingly, during assembly, one fastener 28 may be inserted through the base hole 78 and into a portion of the vehicle body 12, such as the body flange 20, to connect the support body 32 to the vehicle body 12.

Each support base 60 may further define a pair of substantially parallel slits 88 extending through the second base portion 74 to allow the second base portion 74 to resiliently flex relative to the support body 32, thereby facilitating the insertion of the fastener 28 (FIG. 2) through the base 78 and into the vehicle body 12. The slits 88 may be elongated along a third direction indicated by arrow 80. The third direction indicated by arrow 80 may be substantially perpendicular to the first direction indicated by arrow 44 and the third direction indicated by arrow 52.

Each clip receiving portion 58 further includes a first support barrier 90, such as a support wall 92, and a second support barrier 94, such as a rib 96, spaced apart from the first support barrier 90 along the second direction indicated by arrow 80. The first support barrier 90 and the second support barrier 94 are substantially aligned with the second base portion 74 and are collectively configured to retain a portion of the clip 54 (FIG. 6) in the second base portion 74. Specifically, the first support barrier 90 is coupled to a first or front edge 75 of the second base portion 74, whereas the second support barrier 94 is coupled to a second or rear edge 77 of the second base portion 74. The second support barrier 94 is adjacent the fourth support surface 86, whereas the first support barrier 90 is adjacent the third support surface 84. As such, the first support barrier 90 and the second support barrier 94 can jointly limit the movement of the clip 54 (FIG. 6) in the second direction indicated by arrow 80 when the clip 54 is received in the clip receiving portion 58.

Each clip receiving portion 58 further includes a first lateral barrier 98, such as a wall, and a second lateral barrier 100, such as a wall, opposite the first lateral barrier 98. The first lateral barrier 98 couples the first clip retainers 62A to the support base 60, whereas the second lateral barrier 100 couples the second clip retainer 62B to the support base 60. The second lateral barrier 100 may be spaced apart from the first lateral barrier 98 along the first direction indicated by arrow 44. A portion of the clip 54 (FIG. 6) may be disposed in the support openings 64A, B between the first lateral barrier 98 and the second lateral barrier 100. As such, the first lateral barrier 98 and the second lateral barrier 100 limit the movement of the clip 54 (FIG. 6) in the first direction indicated by arrow 44.

With reference to FIG. 6, the attachment assembly 26 includes at least one clip 54 disposed in each clip receiving portion 58 of the support body 32. Each clip 54 may be wholly or partly made of a resilient metallic material, such as galvanized, spring steel, and includes a first clip portion 102, a second clip portion 104, and a clip base 106 interconnecting the first clip portion 102 and the second clip portion 104. The clip base 106 is disposed between the first clip portion 102 and the second clip portion 104 and may have a substantially planar configuration. For example, the clip base 106 may be substantially flat. When the clip 54 is coupled to the support body 32, the clip base 106 may be substantially aligned with the gap 66 (FIG. 5) defined between the two adjacent clip retainers 62A, B. The clip 54 further defines a clip hole 108 substantially aligned with the base hole 78 (FIG. 5) when the clip 54 is coupled to the support body 32. The clip hole 108 extends through the clip base 106 and is configured to receive one fastener 28 (FIG. 2). Accordingly, during assembly, one fastener 28 may be inserted through the clip hole 108, the base hole 78, and into a portion of the vehicle body 12, such as the body flange 20, to interconnect the support body 32, the clip 54, and the vehicle body 12.

As discussed above, the first clip portion 102 and second clip portion 104 are separated by the clip base 106 along the first direction indicated by arrow 44. The first clip portion 102 and the second clip portion 106 may be substantially similar or identical to each other and each is configured to couple the support body 32 to the molding assembly 24. In the depicted embodiment, each of the first clip portion 102 and the second clip portion 104 includes a first or lower clip arm 110, a second or upper clip arm 112, and a clip bridge 114 interconnecting the first clip arm 110 and the second clip arm 112.

Each first clip arm 110 may be substantially planar or flat and is configured, shaped, and sized to be received in one of the support openings 64A, B (FIG. 5) in order to secure the corresponding clip portion 102 or 104 to the support body 32. In particular, when the first clip arm 110 is disposed in one of the support openings 64A, B, the clip retainer (62A or 62B) and the support base 60 (FIG. 5) defining that support opening 64A, B limits the movement of the clip in the third direction indicated by arrow 52. Moreover, when the first clip arm 110 is disposed in one of the support openings 64A, B, the substantially planar shape of the first clip arm 110 may define a plane along the first direction indicated by arrow 44 and the second direction indicated by arrow 80.

As discussed above, each of the first clip portion 102 and second clip portion 104 includes at least one clip bridge 114 coupled between the first clip arm 110 and the second clip arm 112. The clip bridge 114 may be substantially flat or planar and is oriented substantially perpendicular to the first clip arm 110. For example, the substantially planar clip bridge 114 may extend along a plane defined along the first direction indicated by arrow 44 and the third direction indicated by arrow 52.

Each of the first clip portion 102 and second clip portion 104 includes the second clip arm 112 coupled to the clip bridge 114. At least a portion of the second clip arm 112 may be substantially planar or flat. One of the clip retainers 62A or 62B may overlap one of the second clip arm 112. As such, that clip retainer 62 may be spaced apart from second clip arm 112 along the third direction indicated by arrow 52. Accordingly, the attachment assembly 26 defines a clip channel 120 between one of the clip retainers (62A or 62B) and one of the second clip arms 112. The clip channel 120 is configured, shaped, and sized to receive a portion of the molding assembly 24 in order to couple the attachment assembly 26 to the molding assembly 24. In summary, the support member 31 and the clip 54 jointly define the clip channel 120, which is configured to receive a portion of the molding assembly 24, in order to couple the molding assembly 24 to the attachment assembly 26.

In the depicted embodiment, the second clip arm 112 includes a first arm portion 116 and a second arm portion 118. The second arm portion 118 is directly connected to the first arm portion 116 and may be oriented at an oblique angle relative to the first arm portion 116 to facilitate entry of a portion of the molding assembly 24 into the clip channel 120. The first arm portion 116 may be directly connected to the clip bridge 114 and may be substantially parallel to the first clip arm 110. For instance, the substantially planar first arm portion 116 may define a plane along the first direction indicated by arrow 44 and the second direction indicated by arrow 80. The second arm portion 118 includes a resilient tab 122 in the first arm portion 116 to facilitate entry of a portion of the molding assembly 24 into the clip channel 120. The resilient tab 122 may be formed by a slot 124 extending through the first arm portion 116.

Figure 7:
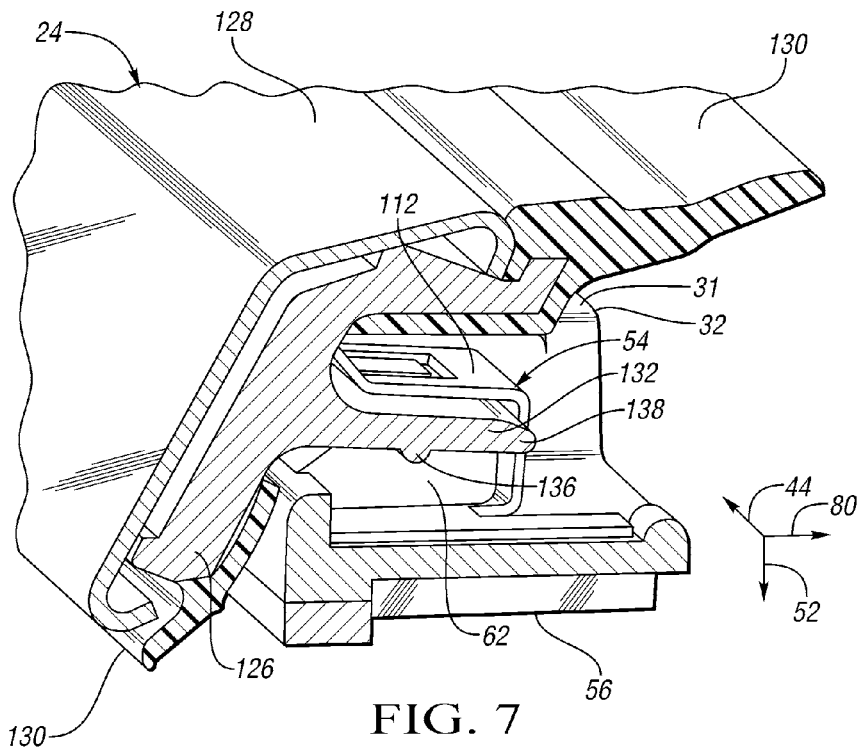
FIG. 7 is a schematic sectional view of a portion of the attachment assembly of FIG. 4, taken along section line 7-7 of FIG. 4.
Figure 8:
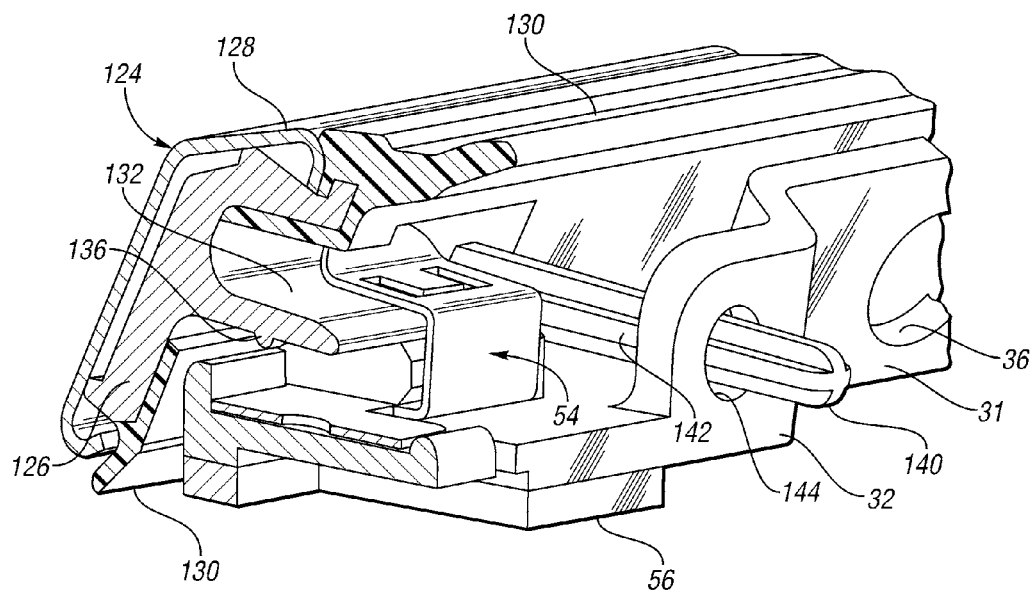
FIG. 8 is a schematic sectional view of a portion of the attachment assembly of FIG. 4, taken along section line 8-8 of FIG. 4.

With reference to FIGS. 4, 7, and 8, the molding assembly 24 includes a molding body 126 and an outer molding panel 128 coupled to the molding body 126. The molding body 126 may be made of a substantially rigid material, such as a hard plastic or a hard metallic material, while the outer molding panel 128 may be made of a substantially rigid and aesthetically pleasing material such as aluminum. The molding assembly 24 may additionally include one or more substantially flexible lips 130 coupled to the molding body 126, the outer molding panel 128, or both. The flexible lips 130 may be wholly or partly made of a plastic and are configured to contact a widow glass (not shown) connected to the molding 128 to provide a buffer between the molding body 126, the outer molding panel 128, the attachment assembly 26 and the window glass 16, thus minimizing wear and tear of the window glass 16.

The molding assembly 24 includes a plurality of a first molding protrusion 132, such as blade 138, configured to be coupled to the clip receiving regions 58 of the attachment assembly 26. Each first molding protrusion 132 may extend from the molding body 126 in the second direction indicated by arrow 80 and may be coupled to, or monolithically formed with, the molding body 126. In particular, each first molding protrusion 132 is configured, shaped, and sized to be received in the clip channel 120 (FIG. 6) between one of the second clip arms 112 and one of the clip retainers 62. During assembly, when each of the first molding protrusions 132 is inserted between the second clip arms 112 and two clip retainers 62A, B (FIG. 6), the clip 54 presses the first molding protrusion 132 against the two clip retainers 62A, B to couple the molding assembly 24 to the attachment assembly 26.

The molding assembly 24 further includes a plurality of second molding protrusions 136 each configured to snap into one of the recesses 70 (FIG. 6). Specifically, each second molding protrusion 136 is configured, shaped, and sized to be received in one of the recesses 70 in order to help couple the attachment assembly 26 to the molding assembly 24. For instance, each second molding protrusion 136 may have a substantially convex shape that corresponds to the substantially concave shape of the recess 70. As such, the second molding protrusions 136 may be configured to mate with (or snap into) the recess 70. In the depicted embodiment, each second molding protrusion 136 extends from each first molding protrusion 132 in the third direction indicated by arrow 52 and may be elongated along the first direction indicated by arrow 44.

With reference to FIG. 8, the molding assembly 24 additionally includes a third molding protrusion 140, such as a molding locating pin 142, configured to be inserted through a locating support hole 144 extending through the support body 32. The third molding protrusion 140 may also be referred to as a four-way locator. The locating support hole 144 may have a substantially circular shape and is configured, shaped, and sized to receive the third molding protrusion 140. During assembly, the third molding protrusion 140 may be inserted through the locating support hole 144 to substantially fix the position of the molding assembly 24 relative to the support body 32.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An attachment assembly, comprising:
  a molding assembly including a molding body and a molding protrusion extending from the molding body;
  a support member including a support body and defining a support opening that extends into the support body, wherein the support body includes a support base and a clip retainer spaced apart from the support base so as to define the support opening;
  a clip including a first clip arm and a second clip arm coupled to the first clip arm, wherein the first clip arm is disposed in the support opening, the first clip arm rests on the support base such that the support base supports the first clip arm, the second clip arm is spaced apart from the support body so as to define a clip channel configured to receive the molding protrusion, the second clip arm defines a first arm surface and a second arm surface opposite the first arm surface, the first arm surface faces away from the clip retainer, and the second arm surface faces toward the clip retainer; and wherein the clip is configured to couple the molding assembly to the support member when the clip channel receives the molding protrusion, and the second clip arm presses the molding protrusion against the clip retainer such that the molding protrusion is in direct contact with the clip retainer and the second arm surface of the second clip arm when the clip channel receives the molding protrusion.

2. The attachment assembly of claim 1, wherein the molding protrusion is a first molding protrusion, and the molding assembly includes a second molding protrusion extending from the first molding protrusion, and the support member defines a recess extending into the clip retainer, the recess is configured to receive the second molding protrusion, and the second molding protrusion is configured to snap into the recess to couple the molding assembly to the support member.

3. The attachment assembly of claim 1, wherein the first molding protrusion is a blade.

4. The attachment assembly of claim 2, wherein the molding assembly includes a third molding protrusion extending from the molding body, the support member defines a support locating hole extending through the support body and configured to receive the third molding protrusion to fix the support the molding assembly relative to the support member.

5. The attachment assembly of claim 4, wherein the third molding protrusion is a locating pin.

6. The attachment assembly of claim 1, wherein the clip retainer is a first clip retainer, and the support member includes a second clip retainer spaced apart from the first clip retainer along a first direction so as to define a gap between the first clip retainer and the second clip retainer.

7. The attachment assembly of claim 6, wherein the support opening is a first support opening, the second clip retainer is spaced apart from the support base so as to define a second support opening.

8. The attachment assembly of claim 7, wherein the clip includes a first clip portion partly received in the first support opening, a second clip portion partly disposed in the second support opening, and a clip base interconnecting the first clip portion and the second clip portion.

9. The attachment assembly of claim 8, wherein the support base includes a first base portion overlapped by the first clip retainer, a second base portion aligned with the gap, and a third clip portion overlapped by the second clip retainer.

10. The attachment assembly of claim 9, wherein the support member includes a support wall at the front edge of the second base portion and a rib at the rear edge of the second base portion, and the support wall and the rib are jointly configured to retain the clip base in the support body.

11. The attachment assembly of claim 7, wherein the first clip portion and the second clip portion are configured to press the first rim protrusion against the first and second clip retainers to couple the molding assembly to the support member when the clip channel receives the first molding protrusion.

12. The attachment assembly of claim 11, wherein the second clip retainer is spaced apart from the first clip retainer along a first direction, and the first molding protrusion extends from the molding body in a second direction, the second direction being substantially perpendicular to the first direction.

13. The attachment assembly of claim 12, wherein the second molding protrusion extends from the first molding protrusion in a third direction, the third direction being substantially perpendicular to the first direction.

14. The attachment assembly of claim 13, wherein the support member includes locating pins extending from the support body in the third direction.

15. A vehicle comprising:
a vehicle body;
a molding assembly including a molding body and a molding protrusion extending from the molding body;
a support member coupled to the vehicle body, wherein the support member includes a support body, and the support body includes a support base and a plurality of clip retainers each spaced apart from the support base;
a plurality of clips coupled to the support member, each clip including a first clip arm and a second clip arm coupled to the first clip arm, wherein the first clip arm rests on the support base such that the support base supports the first clip arm, the second clip arm is spaced apart from the support body so as to define a clip channel, the molding protrusion is at least partly received in the clip channel, the second clip arm defines a first arm surface and a second arm surface opposite the first arm surface, the first arm surface faces away from at least one of the clip retainers, and the second arm surface faces toward at least one of the clip retainers; and
wherein the clip is configured to couple the molding assembly to the support member when the clip channel at least partly receives the molding protrusion, and the second clip arm presses the molding protrusion against at least one of the clip retainers such that the molding protrusion is in direct contact with at least one of the clip retainers and the second arm surface of the second clip arm when the clip channel receives the molding protrusion.

16. The vehicle of claim 15, wherein the support member defines a plurality of support openings extending into the support body, each support opening receiving one of the first clip arms to couple the clips to the support member.

17. The vehicle of claim 16, wherein the support body includes a support base supporting at least the first clip arm, the plurality of clip retainers are each spaced from the support base so as to define the plurality of support openings, and each clip retainer is configured to retain the clip in the support member.

* * * * *